Dec. 27, 1938.  F. H. BONNER  2,141,591
METHOD OF AND MEANS FOR CREATING A MOIST ATMOSPHERE
IN BAKERS' OVENS AND OTHER CHAMBERS
Filed Dec. 17, 1937   7 Sheets-Sheet 1

INVENTOR
FRANCIS HERBERT BONNER
BY
Richards & Geier
Attorneys

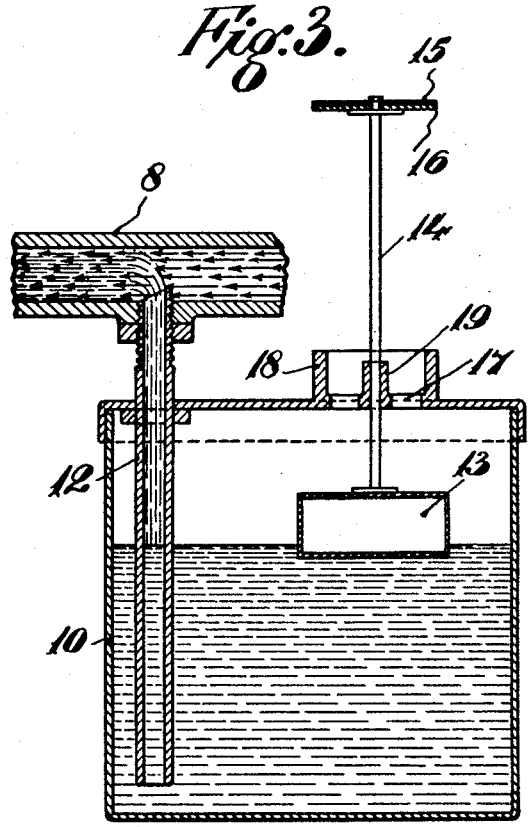
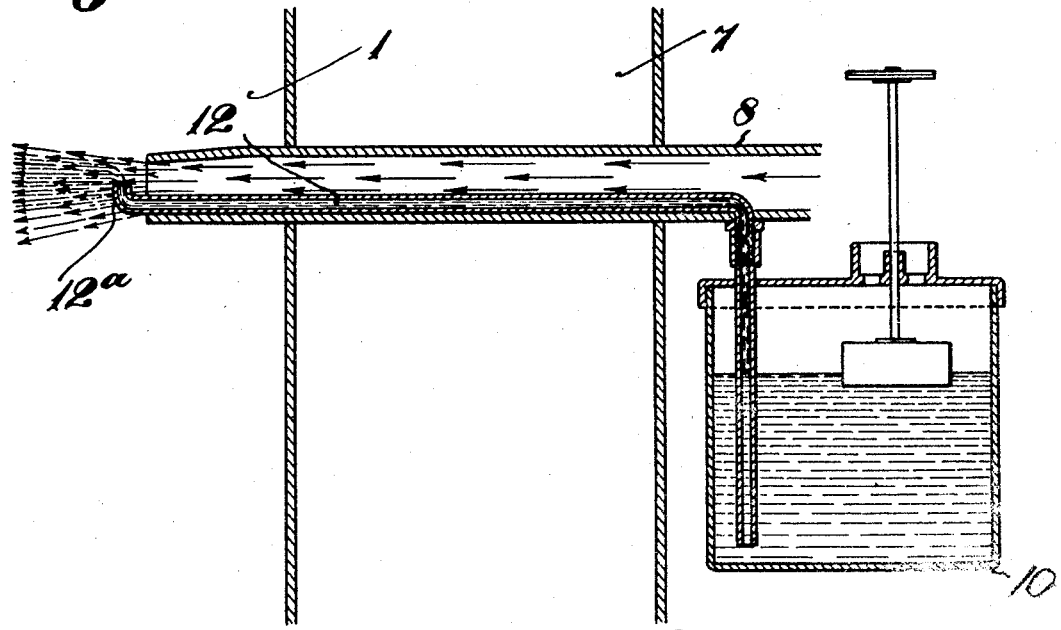

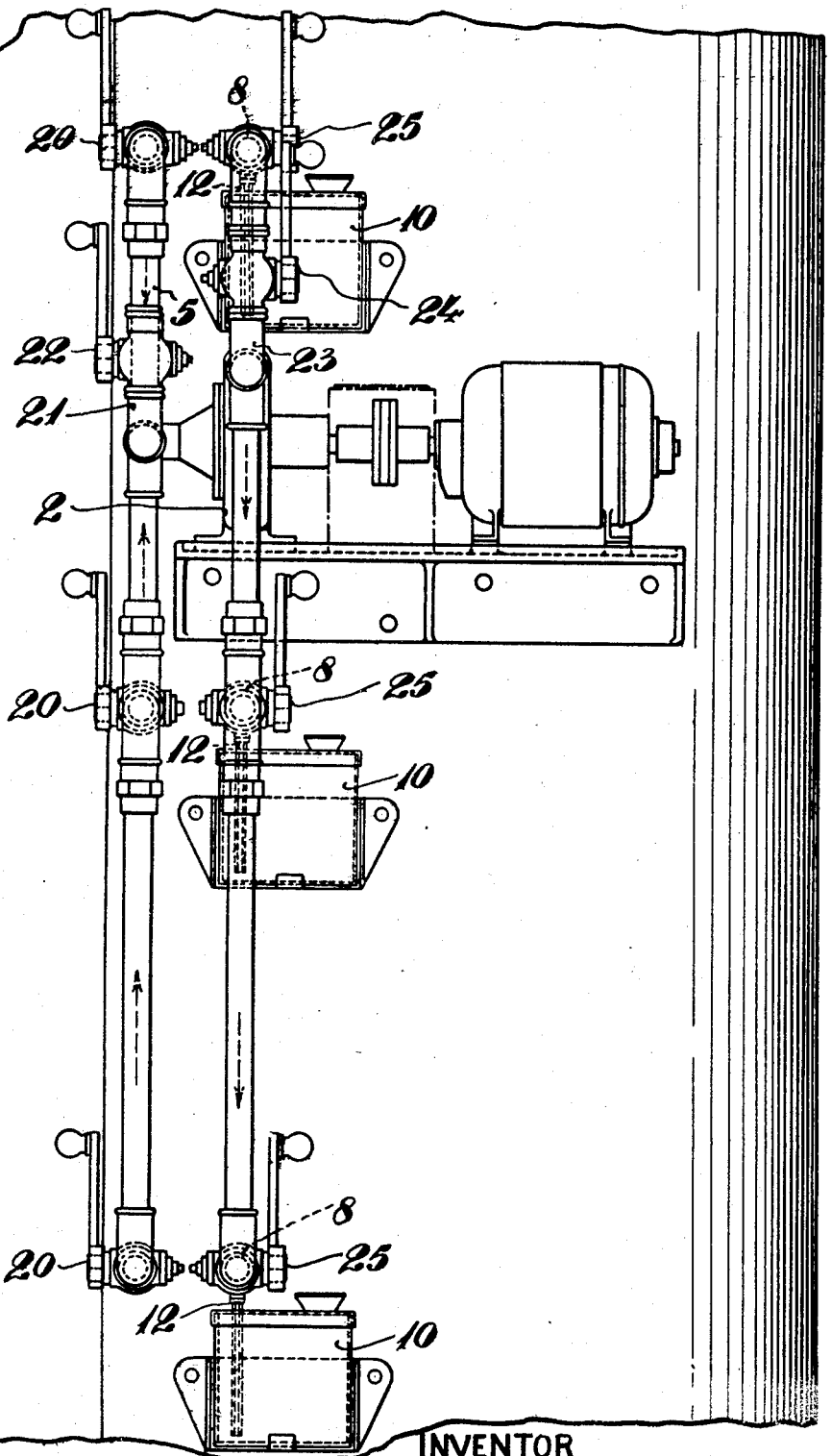

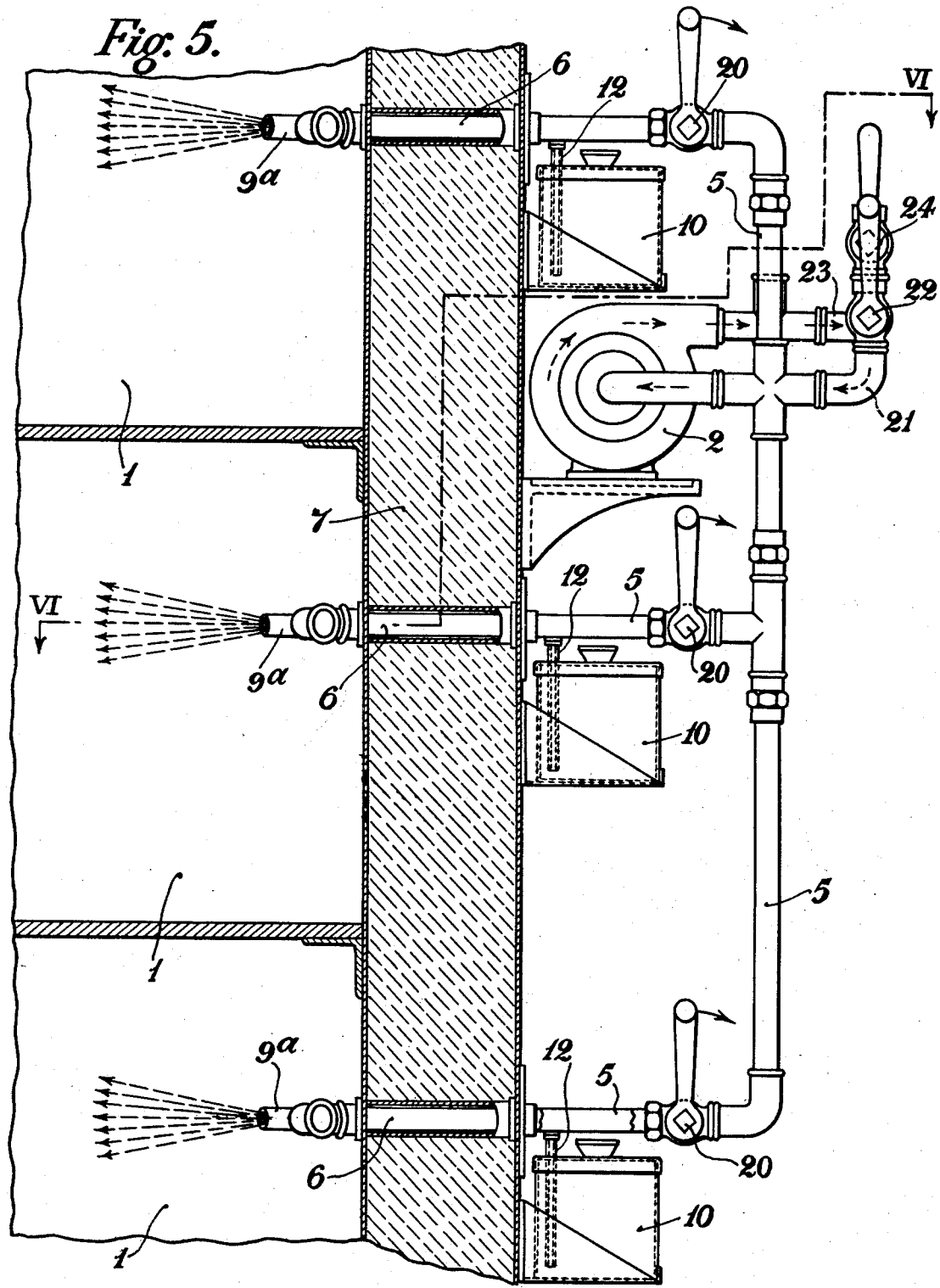

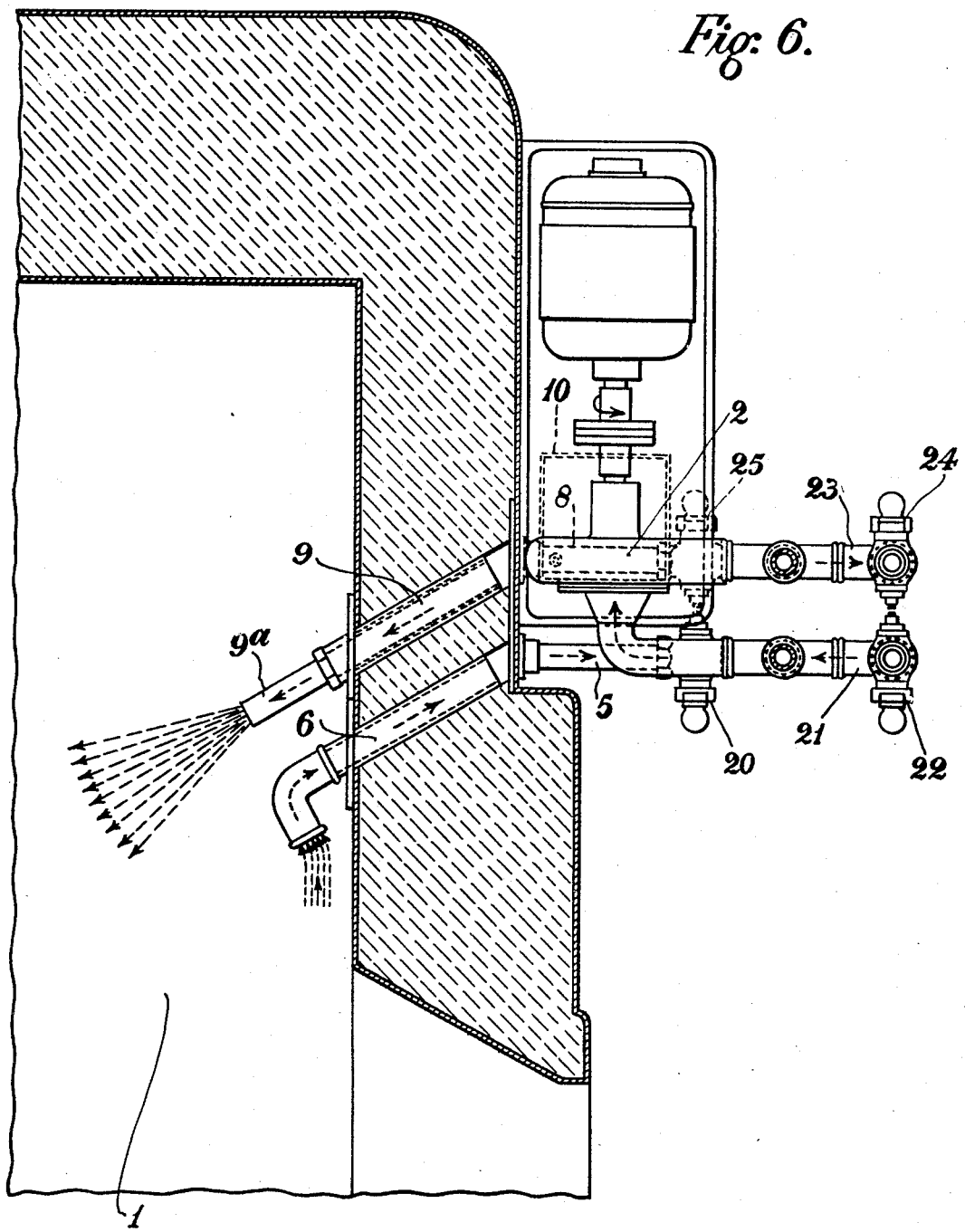

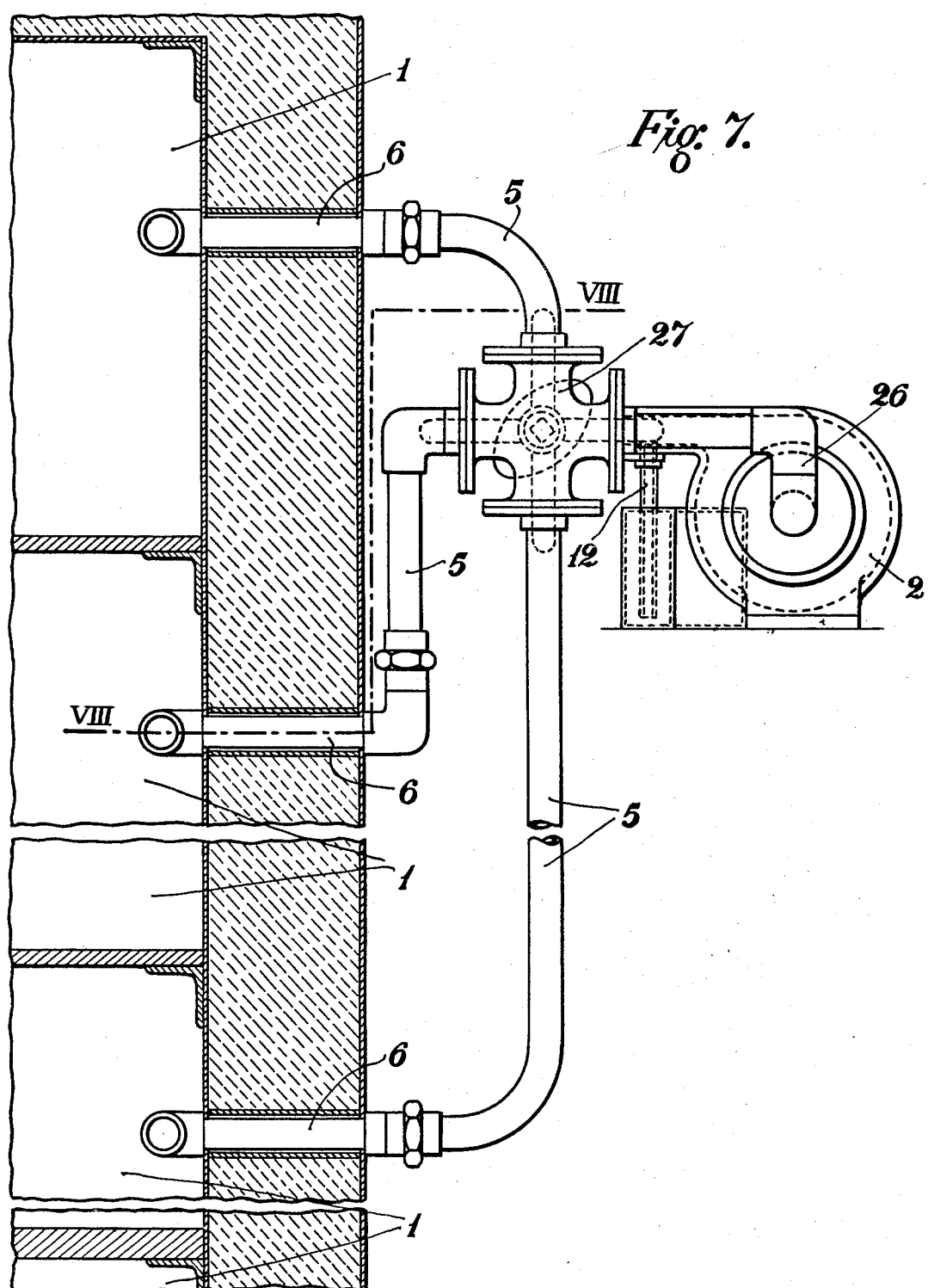

Patented Dec. 27, 1938

2,141,591

UNITED STATES PATENT OFFICE 2,141,591

METHOD OF AND MEANS FOR CREATING A MOIST ATMOSPHERE IN BAKERS' OVENS AND OTHER CHAMBERS

Francis Herbert Bonner, Bristol, England

Application December 17, 1937, Serial No. 180,303
In Great Britain February 10, 1937

11 Claims. (Cl. 107—64)

This invention relates to bakers' ovens, and to other chambers or compartments where a moist or humid atmosphere is sometimes required. It is often desired, in the case of bakers' ovens, to introduce water vapor or steam into the same during the baking, for the purpose, for example, of keeping the outer surface of the dough in a moist condition. The object of the present invention is to provide a simple and effective method of and means for producing water vapor or steam and for admitting it into the oven or baking chamber, or other chamber or compartment, the arrangement being preferably such that the quantity and the humidity of the steam admitted may be readily controlled, according to requirements.

Figure 1 of the accompanying drawings, represents a vertical section through part of a baker's oven provided with apparatus, constructed in accordance with this invention, for supplying steam or water vapor to the interior of the baking chamber.

Figure 3 illustrates a vertical section through the water container, and its associated parts, upon a larger scale.

Figure 4 shows the apparatus modified for supplying steam to three baking chambers, means being provided, in this arrangement, for admitting air from the atmosphere into the system, and also, when required, for exhausting the steam from the baking chambers into the atmosphere, or, if desired, into an auxiliary chamber.

Figure 5 is a side view of the modified apparatus shown in the preceding figure, with the oven wall in vertical section.

Figure 6 represents a sectional-plan on the line VI—VI, Figure 5.

Figure 7 illustrates another modified form of the improved apparatus, in which three-way cocks or valves are employed for directing the steam into, and taking the hot air from, any particular baking chamber of the oven.

Figure 9 illustrates a modified way of arranging the tube from the water chamber, so that its one end projects directly into the oven.

Figure 1:
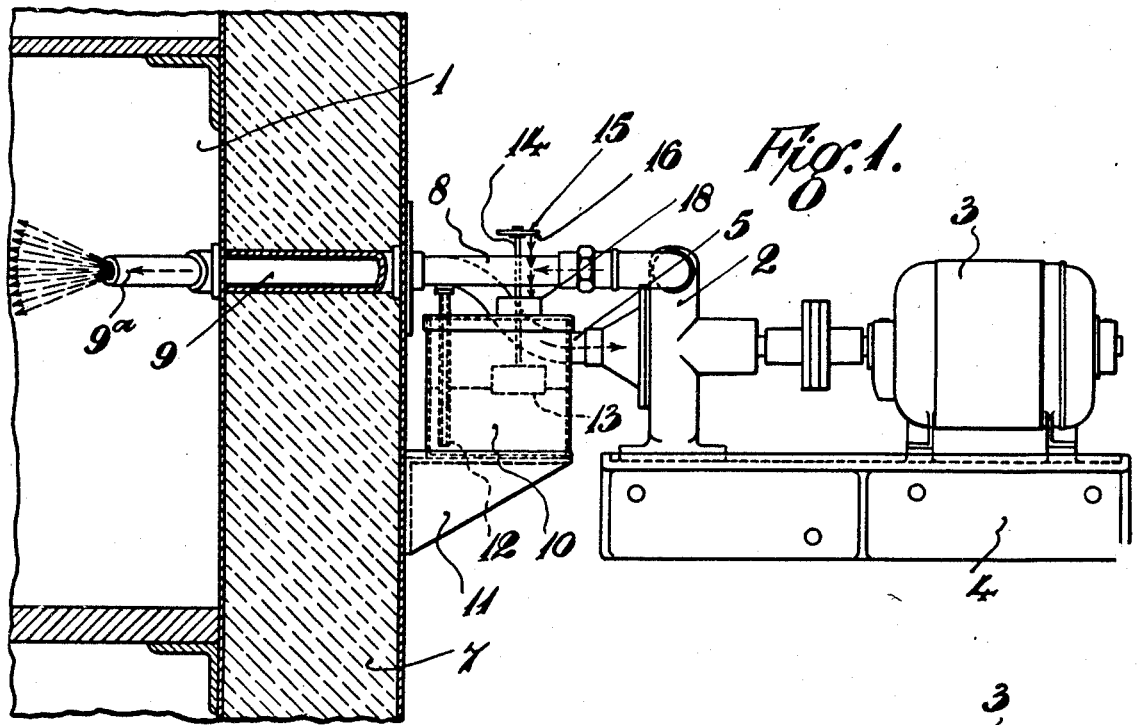
Figure 2:
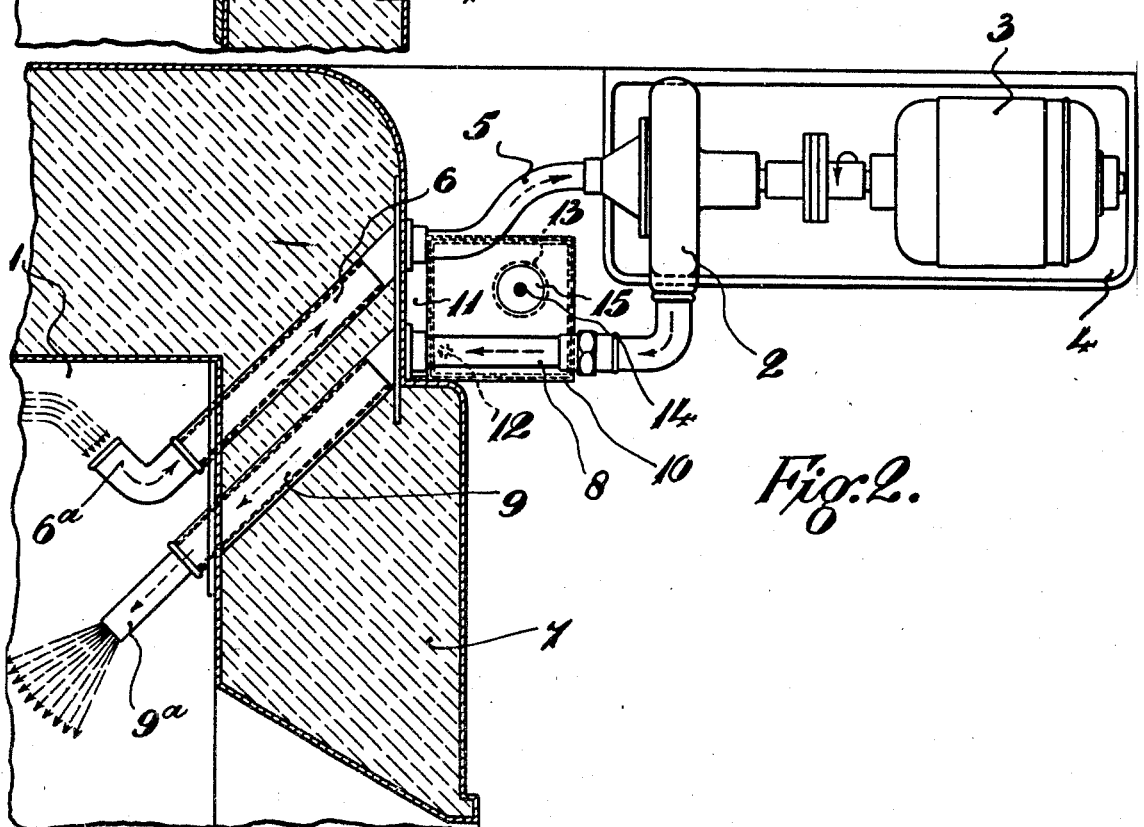
Figure 2 is a horizontal section through the wall of the oven, showing the steam producing apparatus in plan.

Referring to Figures 1 to 3 of the drawings, means are provided for supplying steam or water vapor to the baking chamber 1 of the oven, by extracting hot air from the said baking chamber by means of a fan 2 and causing it to pass over the end of a tube so that water is drawn up from the latter and is converted into steam or water vapor, the hot air returning to the baking chamber 1 and carrying with it the steam or water vapor, which gives a moist or humid atmosphere to the interior of the said baking chamber. The fan 2, which serves to draw the hot air from the baking chamber 1 is adapted to be operated by an electric motor 3 and is of the centrifugal type, both the fan and the electric motor being mounted in a convenient position near the oven on a suitable support, such as on the wall bracket 4. Connected to the central intake aperture of the fan casing is an extractor pipe 5 in communication with a pipe 6 which passes through the wall 7 of the oven, as shown, for example, in Figure 2. The inner end of the pipe 6 may have a terminal extension 6a, shaped as shown, or in any other suitable manner. The outlet aperture of the fan casing, on the other hand, is in communication with a delivery pipe 8, which, in turn, is in communication with a pipe 9 which likewise extends through the oven wall 7, this pipe 9 terminating in a nozzle 9a which projects into the baking chamber 1 as shown. The arrangement is such that when the fan 2 is set in motion by means of the electric motor the hot air will be caused to be drawn from out of the baking chamber 1 through the pipe 6 and the extractor pipe 5 and, after passing through the fan casing, is returned by the fan through the delivery pipe 8 so that it passes back to the oven through the nozzle 9a. In order to enable steam or water vapor to be introduced into the baking chamber 1, a water receptacle 10 is provided, mounted, for example, on a bracket 11 attached to the oven wall and disposed beneath the delivery pipe 8, whilst depending into this water receptacle is a vertical open-ended tube 12 which projects up into the said delivery pipe 8, as shown in Figure 3. The upper end of the tube 12, which may be shaped as shown, or in any other suitable manner, is thus surrounded by the hot air which, when the fan is in operation, is caused to pass through the pipe 8 back into the oven, and the velocity of this air current is such that a column of water is drawn up the tube 12 by induction, owing to the reduced pressure above the said tube, the water container 10 being open to the atmosphere. The arrangement is such that the water is atomized or broken up into very fine particles immediately it issues from the uptake tube 12, and the temperature of the hot air current passing through the delivery tube 8 is such that the atomized water is immediately converted into steam or water vapor which passes along the pipes 8 and 9 with the heated air into the baking chamber 1.

As long as the fan 2 is in operation and there is any water in the receptacle 10 the water will be drawn up the vertical tube 12 and atomized and converted into steam or water vapor, which will be continuously delivered into the baking chamber 1. Hot air will, at the same time, be drawn out of the latter through the pipes 6 and 5, this air, after a time, containing some of the steam that has previously been injected into the chamber. A continuous current of air and steam is thus circulated within the baking chamber, and the moist or humid atmosphere which is thus produced serves to keep the outer skin of the dough which is being baked in a soft plastic condition, which is so essential when certain kinds of bread are being made.

At the same time the constant circulation of the heated air and steam within the baking chamber ensures even baking, and overcomes or minimizes irregular baking due to local heat spots which may, in some cases, be present owing to faulty oven construction.

The water container 10 is provided with a float 13 (see Figure 3) which rises and falls with the water level whilst carried by this float is a vertical rod 14 upon the upper end of which is mounted a disc-like closure 15, faced upon its underside with a layer of rubber 16. The top of the water container is provided with an aperture 17, so that the surface of the water may thus be placed open to the atmosphere, whilst surrounding this aperture is a collar 18 upon which the closure 15 is adapted to rest when the float is lowered, the rod 14 which carries the closure passing through a central guide sleeve 19. The arrangement is such that the closure 15 is raised as long as there is any water in the container 10, so that the water is thus subject to atmospheric pressure, but as soon as the container 10 empties, or slightly before it empties, if desired, the closure 15 seats itself upon the edge of the collar 18. Cold air is thus prevented from being drawn from the container 10 up the tube 12 into the delivery pipe 8. The rod 14 may be graduated, if desired, so that it serves as a gauge for indicating at any moment how much water remains in the receptacle 10. When the closure 15 has moved on to its seating, the water container being empty, no more steam or water vapor can pass from the uptake tube 12 and the steam already produced is now simply circulated by the fan through the baking chamber and the pipes 6, 5, 8 and 9. Steam at atmospheric pressure is generally desirable, and the wetter the steam the more efficiently does it, as a rule, serve its purpose. The arrangement enables the quantity of steam which is injected into the baking chamber, and the degree of humidity, to be varied as required by putting a predetermined quantity of water into the container 10, which may be measured, if necessary, by the gauge rod; alternatively the closure 15 may, if desired, be adjustable upon the rod 14, so that the receptacle 10 is sealed after a definite period, irrespective of the quantity of water still remaining, and as soon as the receptacle has been sealed no more water can be drawn from the tube 12 owing to the partial vacuum which is created in the said receptacle. The tube 12 may be provided with a cock or valve, if desired, so that the water supply, may be cut off, when necessary, independently of the water level. The opening 17 may serve as a filling aperture.

Means may be provided for admitting a controlled quantity of cold air into the apparatus to vary the humidity or temperature of the steam, and means may also be provided for exhausting the oven or baking chamber of steam or water vapor when desired. Such means, whilst equally applicable to the arrangement just referred to, are described in connection with apparatus having a plurality of steam injection pipes each associated with a separate baking chamber and with a separate water receptacle, such apparatus being illustrated in Figures 4 to 6 of the drawings. Referring to these figures, the oven is shown with three baking chambers 1, a separate pipe 6 projecting into each chamber through the wall 7 of the oven. These pipes 6, which are for the withdrawal of the hot air from the respective baking chambers, are connected by the extractor pipes 5 to a single motor-driven fan 2, and the hot air drawn by the latter out of the respective baking chambers 1 is forced along a corresponding number of injection or delivery pipes 8, and is returned through the corresponding pipes 9 and nozzles 9a back into the baking chambers. Associated with each injection or delivery pipe 8 is a separate water container 10 constructed as above described and fitted with a vertical uptake tube 12 projecting into the respective pipes 8. The apparatus acts substantially as in the previous construction. When the fan 2 is working the hot air is drawn out of the three baking chambers 1 along the respective extractor pipes 5 and is caused, after leaving the fan, to pass through the pipes 8, drawing up the water through the tubes 12. The water drawn up is thus atomized and converted into steam or water vapor which is carried along with the hot air into the baking chambers. To enable the hot air supply to be more or less cut off and a controlled quantity of cold air to be admitted into the apparatus the three extractor pipes 5 are each fitted with a separate hand-actuated valve or cock 20, and the intake aperture of the fan communicates with a branch pipe 21 adapted to be placed in communication with the atmosphere by a cock or valve 22. By partly closing the valves 20 and partly opening the valve 22 the quantity of hot air passing from the baking chambers 1 may be reduced and a definite quantity of cold air admitted from the atmosphere through the pipe 21. This will result in an increase in the humidity of the steam entering the baking chambers. By varying the degree of opening and closing of the cocks 20 and 22 the humidity of the steam may be increased or decreased according to requirements.

Means are also provided, in this arrangement, as previously stated, for exhausting the baking chambers 1, so as to extract the steam therefrom, and enable baking to be conducted in a dry heat. This is desirable when the steam has served its purpose, such as when the dough has reached its maximum expansion and growth in the baking. For this purpose the outlet side of the fan 2 is placed in communication with a pipe 23 fitted with a cock or valve 24 adapted to place it in communication with the atmosphere, whilst the steam injection pipes 8 leading to the three baking compartments are fitted with cocks 25. To extract the steam from the baking compartments 1 the cocks 25 are closed and the cock or valve 24 in the pipe 23 is opened. The fan 2 will cause the hot air and steam to be drawn out of the baking chambers, but instead of this hot air and steam being returned to the oven through the pipes 8 and 9 it is compelled to pass through the by-pass pipe 23 to the atmosphere. If desired, this pipe 23 may lead to an auxiliary chamber or compartment where the steam can be usefully utilized, such as to a tank or chamber for washing baking tins or other receptacles; or it may lead to steam jacketed pans and the like. The auxiliary pipes 21 and 23 and the various cocks and valves may, of course, be dispensed with if not required.

Figure 8:
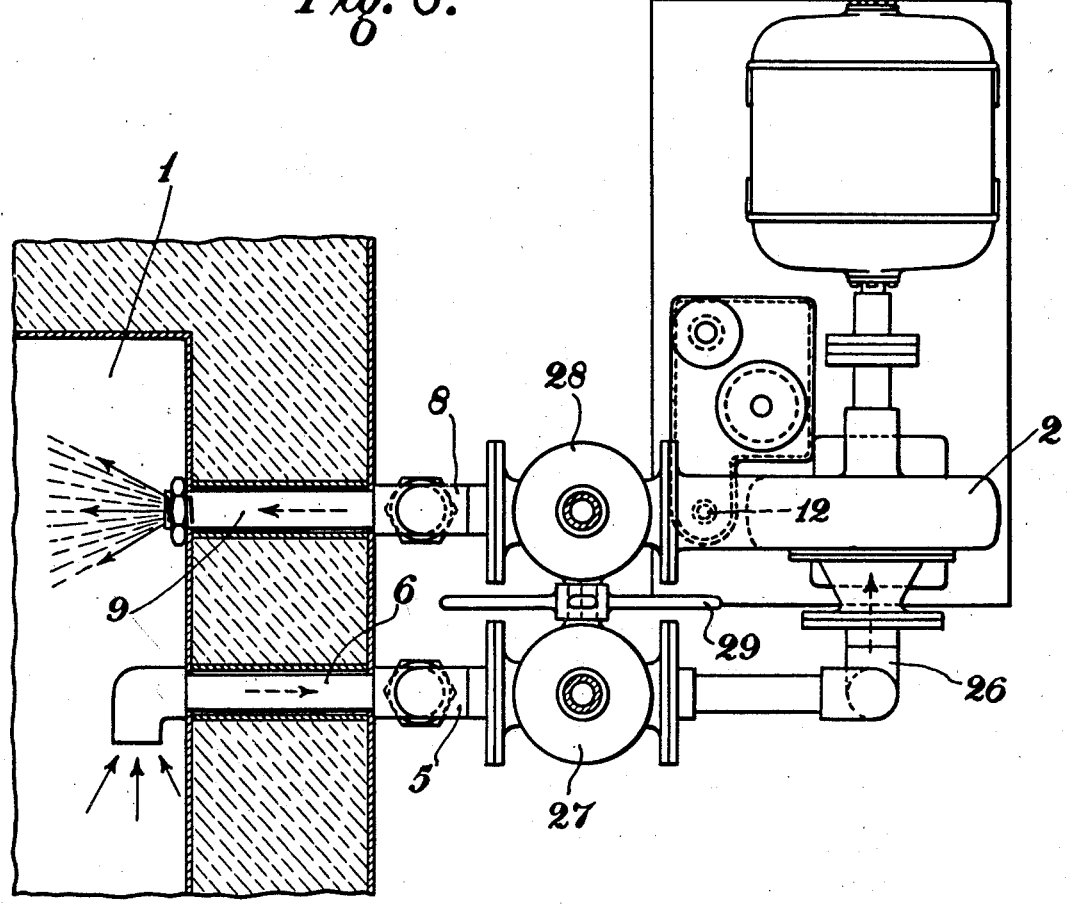
Figure 8 represents a sectional plan view of the apparatus on the line VIII—VIII, Figure 7.

In the arrangement illustrated in Figures 7 and 8 of the drawings, the apparatus is designed so that the steam or water vapour may be directed into any one of a set of three baking chambers, the hot air, or air and steam, being taken from the particular baking chamber into which the steam is injected. A single fan 2 is provided which communicates, through its central intake aperture, with a pipe 26, and the latter is adapted to be placed in communication with one or other of the three extractor pipes 5 through the medium of a three-way valve 27, the extractor pipes 5 leading from the pipes 6 which project into the baking chambers 1. The fan outlet, on the other hand, communicates with the injection pipes 8 through a second three-way valve 28 coupled to the valve 27, both valves being provided with a common actuating member 29, the injection pipes 8 leading to the pipes 9 passing through the wall of the oven. A single water receptacle 10 is provided, with an uptake tube 12 extending into the outlet pipe of the fan, as shown in Figure 7. The arrangement is such that when the member 29 which controls the three-way valves is in one position hot air is withdrawn, for example, from the top baking chamber and, after passing through the top extractor pipe 5 and the valve 27, is caused by the fan to pass over the end of the uptake tube 12, so that water is drawn up through the latter and is atomized and converted into steam. The steam then passes through the other valve 28 into the top baking chamber. When, on the other hand, the valve-actuating member 29 is in another position hot air is taken from the middle baking chamber and steam is injected into the latter; whilst in the third position of the valve-actuating member the hot air is taken from the bottom chamber and steam is injected into the said bottom chamber.

The apparatus may obviously be adapted for injecting or delivering steam or vaporized water into any number of baking chambers, either one water container being provided for all the chambers, or a separate water receptacle being used for each chamber. The water gauge may be omitted, if desired.

The apparatus is not limited to its use for supplying steam to ovens or baking chambers, but may be used, as previously stated, for injecting steam or water vapor into any other chamber or receptacle. The apparatus can, incidentally, be used as a cooling system, for reducing the temperature of an oven or other hot chamber, by withdrawing the hot air through the extraction pipe and discharging it into the atmosphere, the door to the oven or chamber being left open. Also, if desired, the apparatus whilst withdrawing the hot air from an oven or baking chamber may be used only for delivering the steam or water vapor into an independent vessel or chamber such as a "prover".

The improved apparatus is simple in construction and may be maintained and operated at an extremely low cost. Any suitable means, such as a pump, may be used instead of a fan for drawing the hot air out of the oven or other chamber and for delivering or injecting the steam or vaporized water, and instead of the fan, pump or the like being operated by an electric motor, it may be operated by any other means, either by power or by hand. The atomized water may be vaporized and converted into steam in the oven or baking chamber itself instead of in the tube or conduit, and the latter may be arranged in any suitable manner whilst, if necessary, the uptake tube may have a restricted upper end or may terminate in a jet or nozzle.

If desired, the uptake tube 12 may be arranged, as illustrated in Figure 9, to pass right along the delivery pipe 8 so that it projects into the oven compartment 1 through the open inner end of the said delivery pipe. The latter, which extends through the wall 7 of the oven, projects a short distance into the oven compartment, but terminates short of the tube 12, and the hot air passing along the delivery pipe causes the water to be drawn along the said tube 12 from the water container 10 by the inductive action, as previously described. A fine spray thus issues from the tube directly into the oven and is instantly converted into steam or water vapor which mixes with the hot air passing through the pipe 8. The end 12a of the tube 12 may be upturned at right-angles, as shown, so that the open end of the tube lies parallel to, and in the centre of, the hot air stream.

What I claim is:

1. Means for creating a moist or humid atmosphere in a baker's oven, comprising a chamber containing heated air, an impeller, an extractor pipe leading from the said chamber to the impeller, a delivery pipe leading from the latter to the oven, a water container, and a tube projecting into the delivery pipe and extending into the water container.

2. Means for creating a moist or humid atmosphere in a baker's oven, comprising a chamber containing heated air, an impeller, an extractor pipe leading from the said chamber to the impeller, a delivery pipe leading from the latter to the oven, a water container and a tube projecting into the water chamber and extending into the oven, the said tube having an open end disposed opposite the end of the delivery pipe.

3. Means for creating a moist or humid atmosphere in a chamber, comprising an extractor pipe leading from the chamber to an impeller, a delivery pipe leading from the latter back to the chamber and a tube projecting into the delivery pipe and dipping into a water container.

4. Means for creating a moist or humid atmosphere in a chamber, comprising an extractor pipe leading from the chamber to an impeller, a delivery pipe leading from the latter back to the chamber, and a tube dipping into a water container and extending along the delivery pipe into the chamber.

5. Means for creating a moist or humid atmosphere in a chamber, comprising a delivery pipe leading into the chamber, an extractor pipe leading from the said chamber, an impeller between the extractor and delivery pipe adapted to draw heated air from the chamber and return the same to the latter through the delivery pipe, a water container, a tube passing into the delivery pipe and extending into the water container, so that water may be drawn up the tube by an inductive action and converted into steam which passes into the chamber, a valve in the extractor pipe for partly or entirely cutting off the heated air supply, and a valve for enabling air to be drawn in from the atmosphere and delivered into the chamber.

6. Means for creating a moist or humid atmosphere in a chamber, comprising a delivery pipe leading into the chamber, an extractor pipe leading from the said chamber, an impeller between the extractor and delivery pipe adapted to draw heated air from the chamber and return the same to the latter through the delivery pipe, a water container, a tube passing into the delivery pipe and extending into the water container, so that water may be drawn up the tube by an inductive action and converted into steam which passes into the chamber, a valve in the delivery pipe for cutting off the return of the heated air to the chamber through the delivery pipe, a branch pipe communicating with the latter, and a valve controlling the branch pipe, so that steam present in the chamber may be discharged through the said branch pipe.

7. Means for creating a moist or humid atmosphere in a baker's oven having a plurality of baking chambers, comprising a plurality of delivery pipes each leading to a different baking chamber, a plurality of extractor pipes each leading from a different baking chamber, a fan for drawing heated air from the several baking chambers through the extractor pipes and for returning it to the said chambers through the respective delivery pipes, a water chamber associated with each delivery pipe, and a tube leading from each water chamber and passing into the respective delivery pipe, so that water may be drawn up through the tubes by induction and converted into steam, which passes into the baking chambers.

8. Means for creating a moist or humid atmosphere in a baker's oven having a plurality of baking chambers, comprising a plurality of delivery pipes each leading to a different baking chamber, a plurality of extractor pipes each leading from a different baking chamber, a fan for drawing heated air from the several baking chambers through the extractor pipes and for returning it to the said chambers through the respective delivery pipes, a water chamber associated with each delivery pipe, a tube leading from each water chamber passing into the respective delivery pipe, so that water may be drawn through the tubes by induction and converted into steam which passes into the baking chambers, a multi-way valve controlling the several extractor pipes, a multi-way valve controlling the several delivery pipes, and means for operating the two multi-way valves in unison.

9. Means for creating a moist or humid atmosphere in a baker's oven, comprising an extractor pipe leading from the baking chamber of the oven, a delivery pipe leading into the baking chamber, a fan between the extractor pipe and the delivery pipe for drawing hot air from the baking chamber and returning it to the latter through the extractor pipe, a water container open to the atmosphere, a tube dipping into the water container and extending into the delivery pipe, so that water is drawn up through the tube and atomized by induction and converted into steam, a float in the water container and a closure carried by the float adapted to cut off the container from the atmosphere when the container is empty, or when the water falls below a predetermined level.

10. A method of creating a moist or humid atmosphere in an oven, comprising the steps of directing a stream of heated air over water, so that the latter is drawn up and atomized by an inductive action and caused to mix with the air stream, and causing the heated air, with the atomized water contained therein, to pass into the interior of the oven to create a humid atmosphere.

11. A method of creating a moist or humid atmosphere in an oven, comprising drawing a stream of heated air from the oven, directing said stream of heated air over water, so that water is drawn up and atomized by an inductive action and caused to mix with the heated air stream, and causing the heated air, with the atomized water contained therein, to pass into the interior of the oven to create a humid atmosphere.

FRANCIS HERBERT BONNER.